(12) United States Patent
Itoh et al.

(10) Patent No.: US 7,153,336 B2
(45) Date of Patent: Dec. 26, 2006

(54) EXHAUST GAS PURIFYING APPARATUS, PARTICULATE FILTER AND MANUFACTURING METHOD THEREOF

(75) Inventors: Kazuhiro Itoh, Mishima (JP); Shinya Hirota, Susono (JP); Koichiro Nakatani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 358 days.

(21) Appl. No.: 10/485,661

(22) PCT Filed: Aug. 7, 2002

(86) PCT No.: PCT/IB02/03114

§ 371 (c)(1),
(2), (4) Date: Feb. 3, 2004

(87) PCT Pub. No.: WO03/014545

PCT Pub. Date: Feb. 20, 2003

(65) Prior Publication Data

US 2004/0172929 A1    Sep. 9, 2004

(30) Foreign Application Priority Data

Aug. 8, 2001    (JP)    ............................. 2001-241341

(51) Int. Cl.
*B01D 46/00* (2006.01)
*F01N 3/022* (2006.01)

(52) U.S. Cl. ........................ 55/523; 55/282.2; 55/282.3; 55/385.3; 55/487; 55/524; 55/DIG. 5; 55/DIG. 10; 55/DIG. 30; 60/297; 60/311; 264/628; 264/630; 264/631; 264/638; 264/340; 422/177

(58) Field of Classification Search ............... 55/282.2, 55/282.3, 385.3, 486, 487, 523, 524, DIG. 5, 55/DIG. 10, DIG. 30; 60/295, 297, 311; 264/625, 630, 631, 638, 340; 428/116, 117, 428/118; 422/177
See application file for complete search history.

(56) References Cited

U.S. PATENT DOCUMENTS

| | | | |
|---|---|---|---|
| 4,732,593 A | 3/1988 | Kondo et al. | |
| 5,468,455 A | 11/1995 | Bruck | |
| 5,547,640 A * | 8/1996 | Kim | 55/523 |
| 5,709,722 A * | 1/1998 | Nagai et al. | 55/524 |
| 6,242,072 B1 * | 6/2001 | Ueda et al. | 264/631 |
| 6,753,294 B1 * | 6/2004 | Brisley et al. | 502/439 |
| 6,776,814 B1 * | 8/2004 | Badeau et al. | 55/523 |
| 6,898,930 B1 * | 5/2005 | Nakatani et al. | 60/311 |
| 7,008,461 B1 * | 3/2006 | Kuki et al. | 55/523 |

(Continued)

FOREIGN PATENT DOCUMENTS

DE    195 47 599 A1    6/1997

(Continued)

*Primary Examiner*—Jason M. Greene
(74) *Attorney, Agent, or Firm*—Oliff & Berridge, PLC

(57) ABSTRACT

This invention relates to an exhaust gas purifying apparatus having a particulate filter for collecting particulates in exhaust gas. This particulate filter (22) contains partition walls defining paths (50, 51) in which exhaust gas flows. This partition wall is formed of porous material. This particulate filter (22) is created by gathering tips of the partition walls and then baking with the adjacent partition walls being in contact with each other. The adjacent partition walls are bonded together at a predetermined bonding strength if the partition walls are baked such that they are in contact. According to this invention, the end portion of the particulate filter (22) has a higher strength than the predetermined bonding strength.

23 Claims, 10 Drawing Sheets

U.S. PATENT DOCUMENTS

2004/0206062 A1* 10/2004 Ichikawa ..................... 55/523
2005/0274096 A1* 12/2005 Yamada et al. ............... 55/523

FOREIGN PATENT DOCUMENTS

| | | |
|---|---|---|
| DE | 199 25 391 A1 | 12/1999 |
| DE | 199 22 357 C1 | 11/2000 |
| EP | 0 042 302 A1 | 12/1981 |
| EP | 0 559 907 A1 | 9/1993 |
| EP | 0 747 579 A2 | 12/1996 |
| EP | 0 900 922 A2 | 3/1999 |
| GB | 2 351 923 A * | 1/2001 |
| JP | A 8-508199 | 9/1996 |
| WO | WO 94/22556 | 10/1994 |

* cited by examiner

EXHAUST GAS PURIFYING APPARATUS, PARTICULATE FILTER AND MANUFACTURING METHOD THEREOF

FIELD OF THE INVENTION

The invention relates to an exhaust gas purifying apparatus, particulate filter and manufacturing method thereof.

BACKGROUND OF THE INVENTION

A particulate filter for collecting particulates in exhaust gas emitted from an internal combustion engine has been disclosed in published Japanese translation of PCT-application, JP-T-8-508199. In this particulate filter, a honeycomb structure is formed of porous material and some of a plurality of paths (hereinafter referred to as filter paths) in this honeycomb structure are closed at their upstream ends, while remaining filter paths are closed at their downstream ends. Consequently, exhaust gas flowing into the particulate filter always passes through porous walls (hereinafter referred to as filter partition walls) forming the filter paths and flows out of the particulate filter.

In this particulate filter, since exhaust gas always passes through the filter partition wall and after that, flows out of the particulate filter, its particulate collection rate is higher than the particulate collection rate of a particulate filter in which exhaust gas only passes through the filter paths without passing through the partition walls of the particulate filter.

In the particulate filter disclosed in the above described publication, the filter path is closed by gathering the end portions of the filter partition walls and bonding together these end portions. Consequently, the exhaust gas flow-in opening in the filter path is shaped in a funnel. If the exhaust gas flow-in opening in the filter path is shaped in a funnel, exhaust gas flows into the filter path smoothly without a turbulent flow. That is, no turbulent flow is generated in exhaust gas when exhaust gas flows into the filter path. Thus, pressure loss of the particulate filter disclosed in the publication is low.

In the particulate filter of the above-described type, the filter path is completely closed by gathering the end portions of the filter partition walls such that the end portions are in contact with each other and baking the end portions being in contact with each other so as to bond together the end portions. Consequently, the filter path is completely closed. However, when the end portions that are in contact with each other are baked, these end portions are separated due to an influence of thermal expansion of the end portions and surrounding filter partition walls, so that the filter path may not be completely closed.

DISCLOSURE OF THE INVENTION

It is an object of the invention to close the filter path at its end portion securely in a particulate filter of the above-described type.

A first aspect of the invention relates to an exhaust gas purifying apparatus having a particulate filter for collecting particulates in exhaust gas. This particulate filter has a partition wall, which defines a path in which exhaust gas flows. Then, this partition wall is formed of porous material. This particulate filter is created by gathering tips of the partition walls such that adjacent partition walls are brought into contact with each other and baking them. Due to the fact that the partition walls are baked in a state where they are in contact with each other, the adjacent partition walls are bonded together at a predetermined bonding strength. Further, according to the first aspect of the invention, the end portion of the particulate filter has a higher bonding strength than the predetermined bonding strength.

The increased bonding strength can be achieved by a plurality of measures. It is important that the predetermined bonding strength is to be understood as the bonding strength which is achievable by the baked contact surface of end portions of adjacent wall plates bent towards each other.

A second aspect of the invention relates to a manufacturing method of a particulate filter for collecting particulates in exhaust gas. This method includes the steps of forming a preliminary formed body having partition walls defining a path by extruding porous material, closing the path of the preliminary formed body by gathering an end portion of the partition wall of the preliminary formed body so that tips of adjacent end portions are in contact with each other, baking the preliminary formed body, and reinforcing the closed portion in the path.

A third aspect of the invention relates to a manufacturing method of the particulate filter for collecting particulates in exhaust gas. This method includes the steps of forming a preliminary formed body having partition walls defining a path by extruding porous material, closing the path of the preliminary formed body by gathering an end portion of the partition wall of the preliminary formed body so that tips of adjacent end portions are in contact with each other, baking the preliminary formed body, and loading the end portion of the partition wall closing the path of the preliminary formed body with a substance capable of oxidizing particulates.

A fourth aspect of the invention relates to an exhaust gas purifying apparatus having a particulate filter for collecting particulates in exhaust gas. An end portion of a path of the particulate filter includes a bonding portion bonded together at a predetermined bonding strength when tips of adjacent partition walls formed of porous material defining the path are brought in contact and are baked. In the fourth aspect of the invention, an average pore diameter of the bonding portion is smaller than an average pore diameter of other partition wall than the end portion.

A fifth aspect of the invention relates to an exhaust gas purifying apparatus having a particulate filter for collecting particulates in exhaust gas. In the fifth aspect of the invention, adjacent partition walls are bonded together by baking over a predetermined length from the tip of the partition wall made of porous material defining a path of the particulate filter such that the adjacent partition walls are in contact with each other and the adjacent partition walls are boned in parallel with each other on a bonded portion of the partition walls.

A sixth aspect of the invention relates to a particulate filter for collecting particulates in exhaust gas. This particulate filter includes a body portion formed with partition walls made of porous material defining a path in which the exhaust gas flows, and an end portion including a bonding portion bonded at a predetermined bonding strength when tips of the adjacent partition walls are in contact with each other and baked. In the sixth aspect of the invention, the end portion has a higher strength than the predetermined bonding strength.

A seventh aspect of the invention relates to a particulate filter for collecting particulates in exhaust gas. This particulate filter includes a body portion formed with partition walls made of porous material defining a path in which the exhaust gas flows, and an end portion including a bonding portion bonded at a predetermined bonding strength when tips of the adjacent partition walls are in contact with each other and baked. In the seventh aspect of the invention., an average pore diameter of the bonding portion is smaller than an average pore diameter of the partition wall of the body portion.

A eighth aspect of the invention relates to a particulate filter for collecting particulates in exhaust gas. This particulate filter includes a body portion formed with partition walls made of porous material defining a path in which the exhaust gas flows, and a bonding portion baked with tips of the adjacent partition walls being in contact with each other. In the eighth aspect of the invention, the bonding portion is formed by bonding such that the adjacent partition walls are in parallel with each other.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1A:
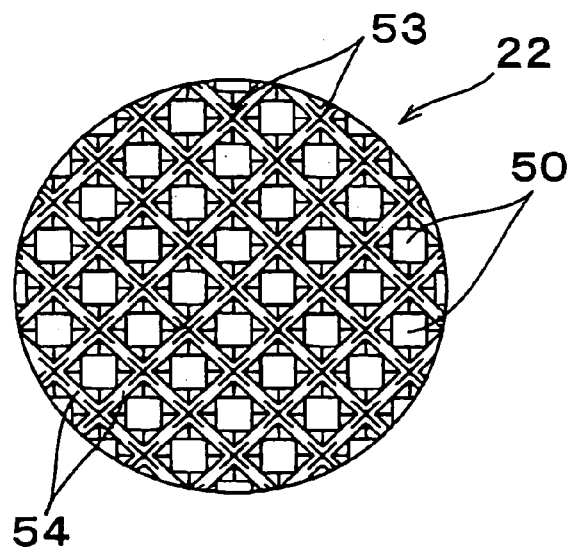
FIGS. 1A, 1B are diagrams showing a particulate filter according to a first embodiment of the invention.
Figure 1B:
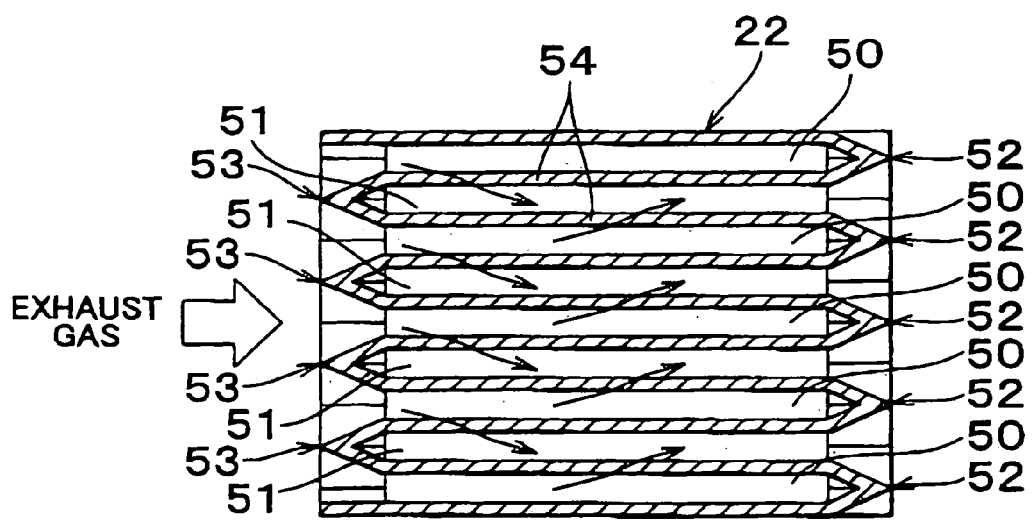

Hereinafter, the first embodiment of the invention will be described with reference to the accompanying drawings. FIG. 1A is an end face diagram of the particulate filter and FIG. 1B is a longitudinal sectional view of the particulate filter. As shown in FIGS. 1A, 1B, the particulate filter 22 has a honeycomb structure, containing a plurality of exhaust gas paths extending in parallel. The exhaust gas path constituted by an exhaust gas flow-in path 50 whose downstream end opening is closed by a tapered wall (hereinafter referred to as downstream tapered wall) 52 and an exhaust gas flow-out path 51 whose upstream end opening is closed by a tapered wall (hereinafter referred to as upstream tapered wall) 53. Namely, some part of the exhaust gas flow path (exhaust gas flow path 50) is closed by the downstream tapered wall 52 at the downstream end thereof, while the remaining exhaust gas flow path (exhaust gas flow-out path 51) is closed by the upstream tapered wall 53 at the upstream end thereof.

The downstream tapered wall 52 is formed by gathering and connecting the downstream end partition portion of the partition wall, which defines the exhaust gas flow-in path 50 of the particulate filter 22. On the other hand, the upstream tapered wall 53 is formed by gathering and connecting the upstream end partition portion of the partition wall, which defines the exhaust gas flow-out path 51 of the particulate filter 22.

According to the present embodiment, the exhaust gas flow-in path 50 and the exhaust gas flow-out path 51 are arranged alternately through a thin partition wall 54. In other words, the exhaust gas flow-in paths 50 and the exhaust gas flow-out paths 51 are constructed such that each exhaust gas flow-in path 50 is surrounded by four exhaust gas flow-out paths 51 while each exhaust gas flow-out path 51 is surrounded by four exhaust gas flow-in paths 50. That is, one exhaust gas flow path (exhaust gas flow-in path 50) of two adjacent exhaust gas flow paths, is closed completely by the downstream tapered wall 52 at the downstream end thereof while the other exhaust gas flow path (exhaust gas flow-out path 51) is closed completely by the upstream tapered wall 53 at the upstream end.

Figure 2A:
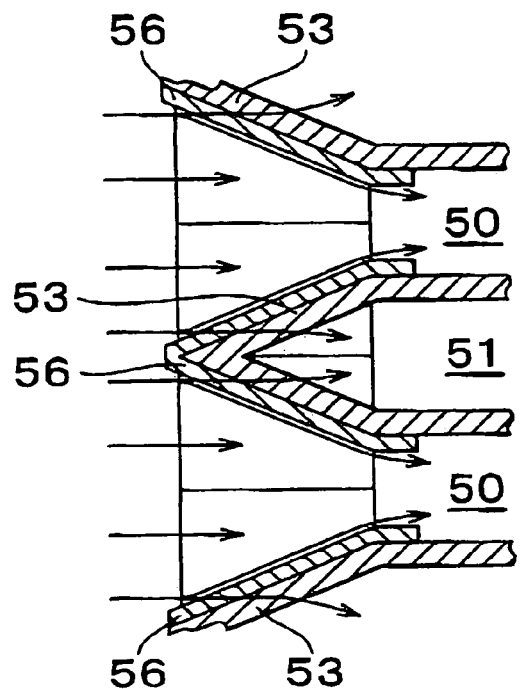
FIGS. 2A, 2B are diagrams showing an upstream end portion and a downstream end portion of the particulate filter of the first embodiment.
Figure 2B:
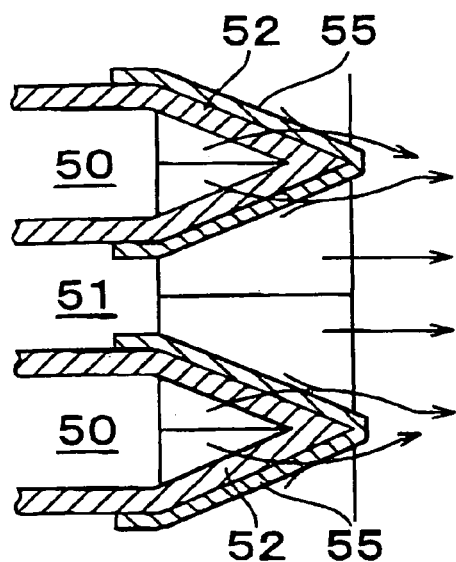

As shown in FIGS. 2A, 2B, reinforcement members 55, 56 are attached to tips of these tapered walls 52, 53. These reinforcement members 55, 56 are attached to the tapered walls 52, 53 so as to cover at least the tips of, or the entire tapered walls 52, 53.

The particulate filter 22 is formed of, for example, porous material such as cordierite. Thus, exhaust gas flowing into the exhaust gas flow-in path 50 passes through the surrounding partition wall 54 as indicated by an arrow in FIG. 1B and flows into the adjacent exhaust gas flow-out path 51. Since the tapered walls 52, 53 are a part of the partition wall 54, these tapered walls 52, 53 are, of course, also formed of the same porous material as the partition wall 54. Further, according to the present embodiment, since the reinforcement members 55, 56 are also formed of porous material, exhaust gas passes through the upstream tapered wall 53 and the reinforcement member 56 as indicated by an arrow in FIG. 2A and flows into the exhaust gas flow-out path 51 and as indicated by an arrow in FIG. 2B, passes through the downstream tapered wall 52 and the reinforcement member 55 and flows out.

The upstream tapered wall 53 is formed in a quadrangular pyramid shape in which the sectional area of the exhaust gas flow-out path 51 is gradually decreased as it approaches the upstream. Of course, the reinforcement member 56, which is attached so as to cover the upstream tapered wall 53, is also formed in a quadrangular pyramid shape which becomes narrower as it approaches the upstream. Thus, the upstream end of the exhaust gas flow-in path 50, formed by four surrounding upstream tapered walls 53 has a quadrangular pyramid shape in which the sectional area of the flow path is gradually increased toward the upstream. As a result, as compared to a case where an intake opening of the exhaust gas flow-in path is formed as shown in FIG. 3A, exhaust gas flows into the particulate filter more easily.

Figure 3A:
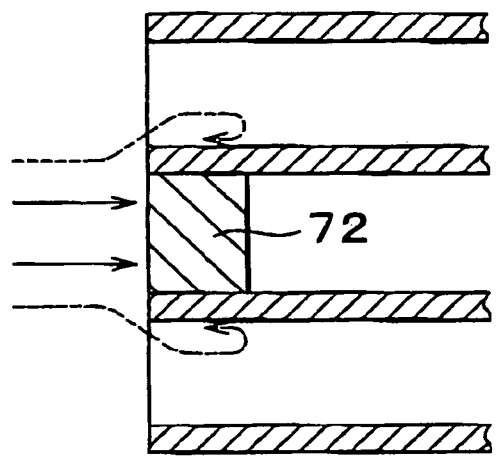
FIGS. 3A, 3B are diagrams showing an upstream end portion and a downstream end portion of a conventional particulate filter.

That is, in the particulate filter shown in FIG. 3A, the upstream end of the exhaust gas flow-out path is closed by a plug 72. In this case, since part of exhaust gas collides with the plug 72 as indicated with a solid line, exhaust gas does not easily flow into the exhaust gas flow-in path. As a result, pressure loss of the particulate filter is increased. Further, since exhaust gas flowing into the exhaust gas flow-in path from near the plug 72 becomes turbulent in the vicinity of the inlet as indicated with a dotted line, it is more difficult for the exhaust gas to flow into the exhaust gas flow-in path. As a result, pressure loss of the particulate filter is further increased.

On the other hand, the particulate filter 22 of the present embodiment allows exhaust gas to flow into the exhaust gas flow-in path 50 without causing any turbulent flow in exhaust gas as shown in FIG. 2A. Thus, according to the present embodiment, exhaust gas can easily flow into the particulate filter 22. Therefore, the pressure loss of the particulate filter is small.

Figure 3B:
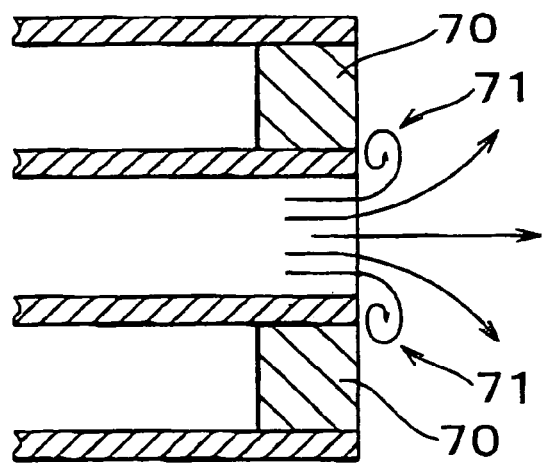

In the particulate filter shown in FIGS. 3A, 3B, particulates in exhaust gas are easily deposited on the upstream end face of the plug 72 and the surface of the partition wall nearby. The reason for this is that exhaust gas collides with the plug 72 and exhaust gas becomes turbulent near the plug 72. However, in the particulate filter 22 of the present embodiment, the upstream end face which exhaust gas strongly collides with does not exist, since the upstream tapered wall 53. Further, the reinforcement member 56 are quadrangular pyramid and exhaust gas does not become turbulent near the upstream end face. Therefore, according to the present embodiment, a great number of particulates are not deposited on the upstream end region of the particulate filter 22, so that the pressure loss of the particulate filter 22 is suppressed.

On the other hand, the downstream tapered wall 52 of the present embodiment is formed in a quadrangular pyramid shape such that the sectional area of the flow path of the exhaust gas flow-in path 50 is gradually decreased as it approaches the downstream. Of course, the reinforcement member 55 attached so as to cover the downstream tapered wall 52 is also formed to be accommodated in a quadrangular pyramid shape which becomes narrower as it approaches the downstream. Thus, the downstream end of the exhaust gas flow-out path 51 formed by four surrounding downstream tapered walls 52 expands in a quadrangular pyramid shape in which the sectional area is gradually decreased as it approaches the downstream. As a result, exhaust gas easily flows out of the particulate filter as compared to a case where an exit opening of the exhaust gas flow-out path is formed as shown in FIG. 3B.

That is, in the particulate filter shown in FIG. 3B, the downstream end of the exhaust gas flow-in path is closed by a plug 70 and the exhaust gas flow-out path extends straight up to the exit. In this case, part of exhaust gas flowing out of the exit opening in the exhaust gas flow-out path flows along the downstream end face, so that a turbulent flow 71 is formed in the vicinity of the exit opening in the exhaust gas flow-out path. If a turbulent flow is formed in this way, exhaust gas does not easily flow out of the exhaust gas flow-out path.

On the other hand, in the particulate filter of the present embodiment, as shown in FIG. 2B, no turbulent flow is formed in exhaust gas, so that the exhaust gas can flow out of the exit opening of the exhaust gas flow-out path 51. Thus, according to the present embodiment, exhaust gas relatively easily flows out of the particulate filter. Therefore, the pressure loss of the particulate filter 22 is small.

In the meantime, the tapered walls 52, 53 and the reinforcement members 55, 56 may be formed in any other form than the quadrangular pyramid, for example, conical as long as it becomes gradually narrower as it approaches outside of the particulate filter 22.

Next, the reinforcement member of the first embodiment will be described in detail. The tapered walls 52, 53 of the particulate filter 22 of the above-described type are formed by gathering the partition walls which define the paths in the honeycomb structure made of porous material, that is, end portions of the partition walls 54 so that tips thereof are in contact with each other and baking the honeycomb structure. That is, the end portions of the partition walls are baked, so that the end portions are bonded together.

Actually, when the honeycomb structure is baked, a hole may be made in the tip of the tapered walls 52, 53 depending on a case, since the tips of the partition walls 54 are separated due to an influence of thermal expansion of the end portions of the partition walls. According to the present embodiment, since the basic configuration of the particulate filter 22 is that the end portions of the exhaust gas flow paths (exhaust gas flow-in path 50, exhaust gas flow-out path 51) are closed completely by the tapered walls 52, 53, the hole is not made in the tip of the tapered walls 52, 53 like this.

According to the present embodiment, before the honeycomb structure is baked, the reinforcement members 55, 56 are disposed at the tips of the tapered walls 52, 53 and after that, the honeycomb structure is baked. While the tapered walls 52, 53 are formed by bonding together the tips of the separate partition walls 54, the reinforcement members 55, 56 are integrated members. Therefore, they hold the tips of the partition walls 54, which form the tapered walls 52, 53, so that they do not leave each other, when the honeycomb structure is baked.

According to the present embodiment, the bonding strength of the bonding region of the partition wall 54, which constructs the tapered walls 52., 53, is increased, thereby preventing a hole from being made in the tips of the tapered walls 52, 53.

The average pore diameter of each of the reinforcement members 55, 56 is determined by the degree of increase of the pressure loss of the entire particulate filter 22 when the reinforcement members 55, 56 are attached to the tips of the tapered walls 52, 53 and the extent of reinforcement necessary for preventing any hole from being made in the tips of the tapered walls 52, 53. That is, a reinforcement member having a larger average pore diameter is used as the necessity of suppressing the increase of the pressure loss is larger. Then, a reinforcement member having a smaller average pore diameter is used as the level of reinforcement needs to be increased. In the meantime, the average pore diameter of the reinforcement member in the present embodiment is smaller than the average pore diameter of the partition wall 54.

As a modification of the first embodiment, the reinforcement members 55, 56, particularly the tips thereof may be loaded with a substance capable of oxidizing particulates in exhaust gas. Consequently, the average pore diameter of the reinforcement members 55, 56 becomes smaller than a case where they are loaded with no substance capable of oxidizing particulates. Thus, even if a hole is made in the tip of the tapered walls 52, 53 when the honeycomb structure is baked, the average pore diameter of the tip of the reinforcement members 55, 56 is small. Therefore, the particulates in exhaust gas are prevented from flowing out of the particulate filter without being collected by the particulate filter.

Of course, if the hole in the tip of the tapered walls 52, 53 is closed by attaching the reinforcement members 55, 56 to the tapered walls 52, 53 after the honeycomb structure is baked, at least the object of the invention is achieved. In this case also, particulates in exhaust gas can be prevented from flowing out of the particulate filter 22 securely without being collected by the reinforcement members 55, 56 by reducing the average pore diameter of the reinforcement members 55, 56, which are allowed to carry a substance capable of oxidizing the particulates.

In the meantime, it is important to construct the particulate filter 22 so that the pressure loss is latently small and keep the pressure loss from exceeding largely a latently achievable value during use of the particulate filter 22, in viewpoints of its performance.

That is, in case where an internal combustion engine is provided with a particulate filter, operation control of the internal combustion engine is so designed considering the latent pressure loss of the particulate filter. Even if the particulate filter is constructed so as to keep the pressure loss low, if the pressure loss exceeds its latently achievable value during use, the performance of the internal combustion engine is decreased.

Thus, according to the present embodiment, the partition wall which defines the upstream end region of the exhaust gas flow path in the particulate filter 22 is formed of a tapered wall and further, the reinforcement member covering this partition wall is formed also of a tapered member. Consequently, a turbulent flow is prevented when exhaust gas flows into the exhaust gas flow path so as to keep the pressure loss of the particulate filter 22 latently low.

As described above, the partition wall which defines the upstream end region of the exhaust gas flow path in the particulate filter 22 is formed of the tapered wall and the reinforcement member covering this partition wall is formed of the tapered member. Therefore, particulates are not easily deposited on the wall of such tapered reinforcement member. That is, the particulates are prevented from being deposited on the wall of the tapered reinforcement member to produce a turbulent flow in exhaust gas flowing into the exhaust gas flow path during use of the particulate filter 22. As a result, the pressure loss can be prevented from being increased far beyond its latently achievable value during use of the particulate filter 22.

As described above, particulates are not easily deposited on the upstream reinforcement member 56 during use of the particulate filter 22. However, the particulates can be deposited on the upstream reinforcement member 56. In this case, the pressure loss is increased during use of the particulate filter 22.

Thus, according to the above-described modification of the embodiment of the invention, the upstream reinforcement member 56 is loaded with a substance capable of oxidizing and removing particulates so as to oxidize and remove the particulates deposited on the upstream reinforcement member 56. As a result, since particulates collected by the upstream reinforcement member 56 are continuously oxidized and removed, no great number of the particulates are deposited on the upstream reinforcement member 56. Therefore, the pressure loss can be kept low during use of the particulate filter 22.

According to the present embodiment and its modification, a problem inherent to the structure of closing the exhaust gas flow-out path 51 that is, a problem that the pressure loss deviates from its achievable value during use of the particulate filter can be avoided by the upstream tapered wall 53 and the tapered reinforcement member 56 made of porous material in order to reduce the pressure loss of the particulate filter 22 latently.

According to the modification of the present embodiment, a substance capable of oxidizing particulates is loaded on the entire particulate filter 22, that is, not only on the upstream reinforcement member 56, but also on the upstream tapered wall 53, the partition wall 54, the downstream tapered wall 52 and the downstream reinforcement member 55. Further, a substance capable of oxidizing particulates is carried by not only the walls of the upstream reinforcement member 56, the upstream tapered wall 52, the partition wall 54, the downstream tapered wall 52, and the downstream reinforcement member 55, but also these pore walls inside. According to the modification of the present embodiment, the amount by a unit volume of the substance capable of oxidizing particulates loaded on the upstream reinforcement member 56 and the upstream tapered wall 53 is larger than the amount by a unit volume of the substance capable of oxidizing particulates loaded on the partition wall 54, the downstream tapered wall 52 and the downstream reinforcement member 55.

According to the present embodiment, although the upstream end opening and the downstream end opening of the particulate filter are closed completely, the concept of the invention can be applied to the particulate filter in which only any one of the upstream end opening and the downstream end opening is completely closed.

Figure 4A:
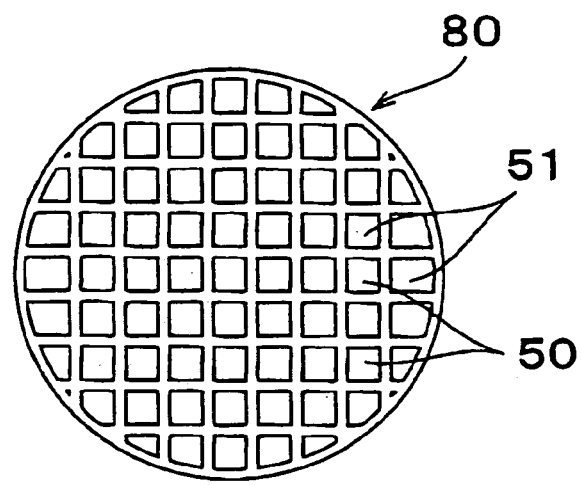
FIG. 4A is a front view showing a honeycomb structure.
Figure 4B:
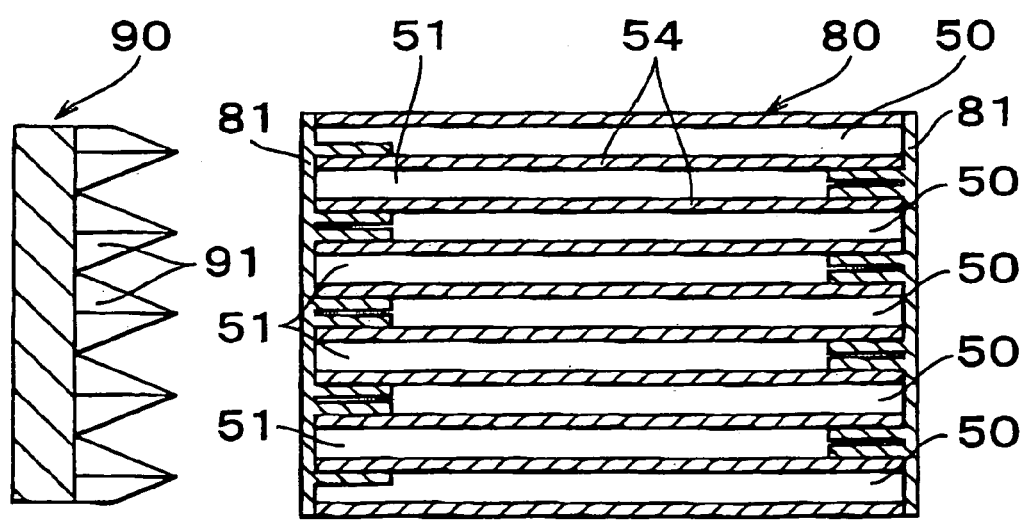
FIG. 4B is a side view showing the honeycomb structure, reinforcement member and die.

Next, a manufacturing method of a particulate filter of the present embodiment will be described briefly. First, a cylindrical honeycomb structure 80 is formed of porous material such as cordierite by extrusion as a preliminary formed body as shown in FIGS. 4A, 4B. The honeycomb structure 80 has a plurality of exhaust gas flow paths each having a square section. Part of these exhaust gas flow paths serves as the exhaust gas flow-in paths 50 in the particulate filter 22, while the remaining exhaust gas flow paths serves as the exhaust gas flow-out paths 51 in the particulate filter 22.

Figure 5A:
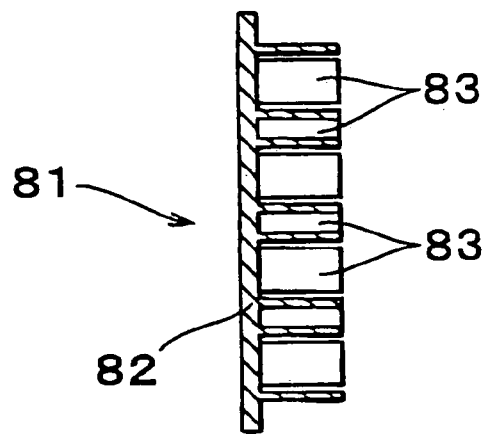
FIGS. 5A, 5B are diagrams showing the reinforcement member in FIG. 4B.
Figure 5B:
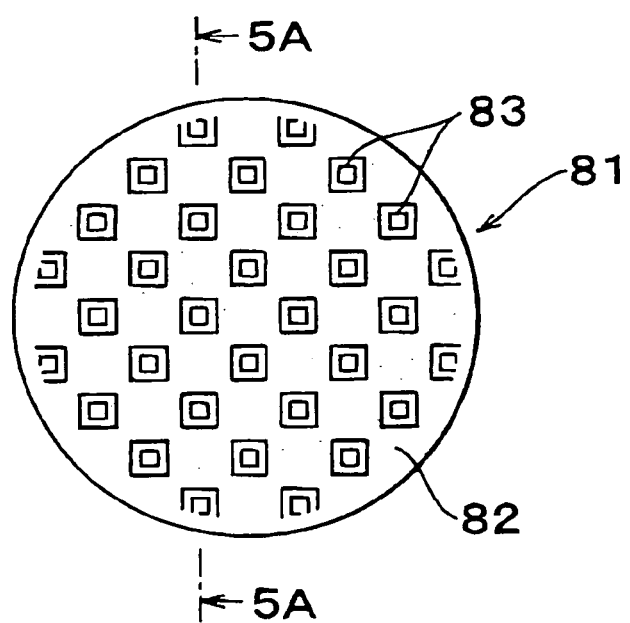

Next, a reinforcement member 81 made of porous material is disposed on each end face of the honeycomb structure 80 as shown in FIG. 4B. As shown in FIG. 5A, each reinforcement member 81 has a disc portion 82 fitting to a circular end face of the honeycomb structure 80. As shown in FIG. 5A, a plurality of leg portions 83 extends vertically from the disc portion 82. As shown in FIG. 5B, each of these leg portions 82 has a square of the square tube.

When the reinforcement member 81 is disposed on the end face upstream of the honeycomb structure 80, each leg portion 83 is accommodated in the exhaust gas flow-in path 50. On the other hand, when the reinforcement member 81 is disposed on the end face downstream of the honeycomb structure 80, each leg portion 83 is accommodated in the exhaust gas flow-out path 51. FIG. 5A indicates a sectional view taken along the lines 5A—5A in FIG. 5B.

Next, a die 90 shown in FIG. 6 is pressed to the end face of the honeycomb structure 80 together with the reinforcement member 81. The die 90 is pressed to one end face of the honeycomb structure 80 and then to the other end face. Of course, it is permissible to prepare two dies 90 and press them to each end face of the honeycomb structure 80 at the same time.

Figure 6A:
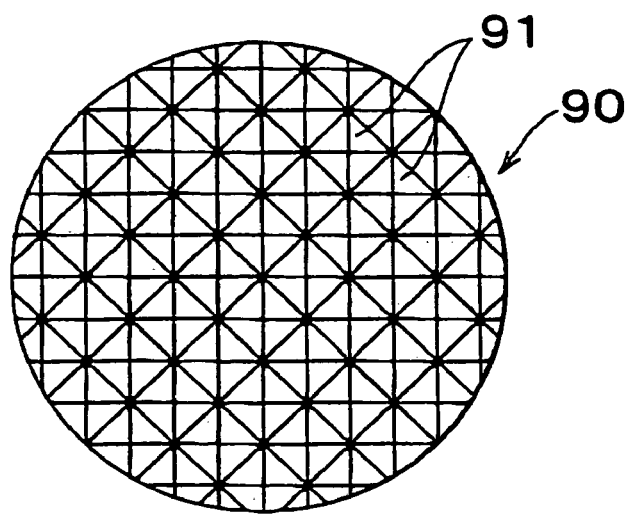
FIGS. 6A, 6B are diagrams showing the die in FIG. 4B.
Figure 6B:
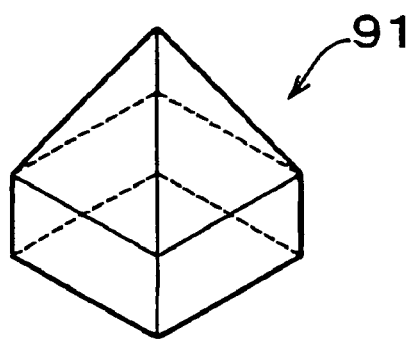

As shown in FIG. 6A, the die 90 has a plurality of quadrangular pyramid shaped protrusions 91. FIG. 6B shows a protrusion 91. The die 90 is pressed to an end face of the honeycomb structure 80 together with the reinforcement member 81 such that the protrusions 91 are inserted into each predetermined exhaust gas flow path. When the protrusions 91 of the die 90 are inserted into predetermined exhaust gas flow paths, the disc portion 82 of the reinforcement member 81 is broken by these protrusions 91. If the die 90 is moved further toward the end face of the honeycomb structure 80, the disc portion 82 and the leg portion 83 of the reinforcement member 81 are gathered. At the same time, the partition walls 54, which form a predetermined exhaust gas flow path, are gathered so as to form the tapered walls 52, 53. Consequently, the predetermined exhaust gas flow paths are closed completely by the tapered walls 52, 53 covered by the reinforcement members 55, 56.

Next, the honeycomb structure 80 is dried, and then, the honeycomb structure 80 is baked. Next, the honeycomb structure is loaded with a substance capable of oxidizing particulates. As a result, the particulate filter 22 is formed.

As described above, the end portion of the particulate filter 22 is closed by the tapered walls 52, 53 composed of the same porous material as the partition wall 54. Therefore, the exhaust gas flow path (exhaust gas flow-in path 50, exhaust gas flow-out path 51) of the particulate filter 22 can be closed by the same material as the partition wall 54 according to such a simple method of pressing the die 90 against the end face of the honeycomb structure 80 as described above.

The step of disposing the reinforcement member 81 on the end face of the honeycomb structure 80 and pressing the die 90 against the end face of the honeycomb structure 80 may be executed after the honeycomb structure 80 is dried. Alternatively, it is permissible to soften the end portion of the honeycomb structure 80 after the honeycomb structure 80 is baked, then dispose the reinforcement member 81 on the end face of the honeycomb structure 80 and press the die 90 to the softened end portion. In this case, the end portion of the honeycomb structure 80 is baked again after that.

As a second modification of the present embodiment, a quadrangular pyramid shaped reinforcement member composed of porous material may be disposed directly on the tapered wall after the honeycomb structure 80 is baked.

Although the leg portion 83 of the reinforcement member 81 is means for positioning securely and holding the reinforcement member 81 on the honeycomb structure, the leg portion 83 may be eliminated if other means for achieving this is provided.

Figure 7A:
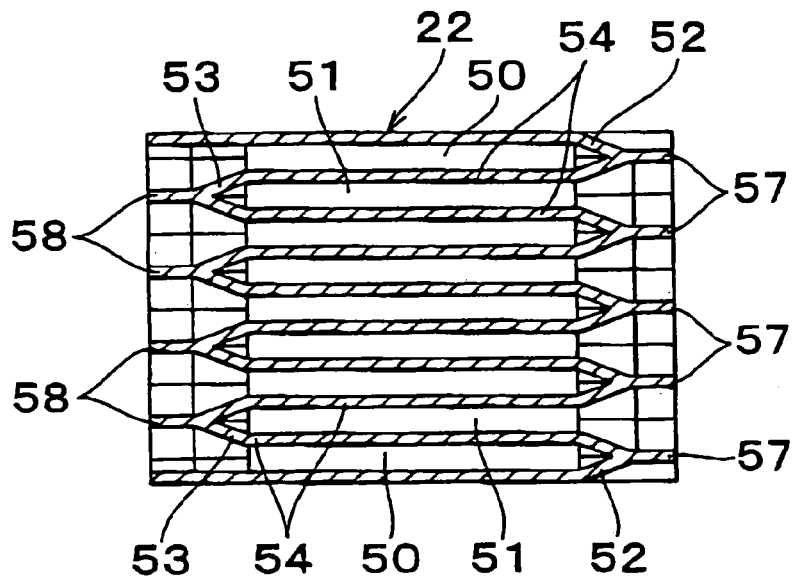
FIG. 7A is a diagram showing the particulate-filter of the second embodiment.

Next, the particulate filter of the second embodiment will be described. According to the second embodiment, as shown in FIG. 7A, the end portions of the partition walls 54 are bonded over a predetermined length from the tip so as to form extended portions 57, 58. In the downstream region of the particulate filter 22, the end portions downstream of the partition walls 54 are bonded together with adjacent parallel portions over a predetermined length toward the upstream from the tip so as to form an extended portion 57. On the other hand, in the upstream region of the particulate filter 22, the end portions upstream of the partition walls 54 are bonded together over a predetermined length toward downstream from the tip so as to form an extended portion 58.

Figure 7B:
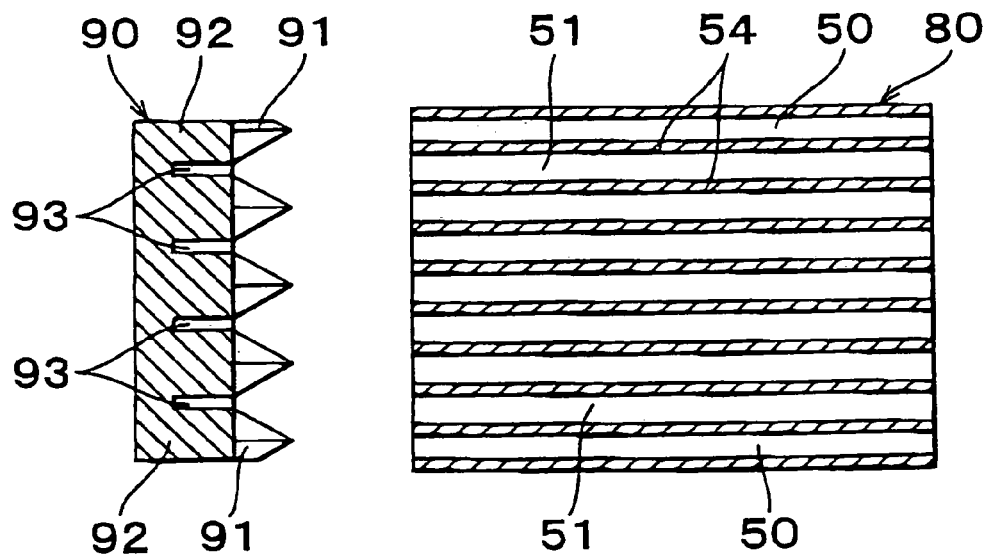
FIG. 7B is a diagram showing the honeycomb structure and die of the second embodiment.

As shown in FIG. 7B, these extended portions 57, 58 are formed by pressing the die 90 having the quadrangular pyramid shaped protrusions 91 and a rectangular portion 92 adjacent to this protrusion 91 and further containing a groove 93 between these rectangular portions 92 against each end face of the honeycomb structure 80.

Thus, according to the present embodiment, the bonding region of the end portions bonded together of the partition walls 54 in the end portion region of the particulate filter 22 is larger than the bonding region when only the tips of the partition walls are bonded together. For this reason, the bonding strength of the partition walls in the end portion region of the particulate filter 22 of the present embodiment is higher than the bonding strength when only the tips of the partition walls are bonded together.

As a modification of the second embodiment, the bonding strength of the end portions of the partition walls 54 which construct the extended portions 57 can be increased by loading on the extended portions 57, 58 with a substance capable of oxidizing the particulates. Of course, the entire particulate filter 22 may be loaded with the aforementioned substance capable of oxidizing the particulates.

In case of loading the honeycomb structure 80 with a substance capable of oxidizing particulates according to the present embodiment, the step of loading the honeycomb structure 80 with this substance capable of oxidizing particulate is carried out after the step of baking the honeycomb structure 80.

Next, the particulate filter 22 of the third embodiment will be described. The structure and operation of the particulate filter 22 of the third embodiment are the same as those of the first embodiment except the items described below. Therefore, description about the same structure and operation as the first embodiment is omitted.

According to the third embodiment, the reinforcement members 55, 56 of the first embodiment are omitted. According to the third embodiment, in place of them, the average pore diameter of the end portions of the partition walls 54 to be bonded together so as to form the tapered walls 52, 53 is set smaller than the average pore diameter of the partition wall 54.

According to the present embodiment, assuming a case where the areas of the end portions of the partition walls 54 bonded together are equal, the area of the end portions of the partition walls 54 substantially being in contact with each other is larger than a bonding region of tips in an end portions having the same average pore diameter as the partition wall 54. Therefore, the bonding strength of the partition walls in an end portion region of the particulate filter 22 of the present embodiment is higher than the bonding strength of a case where the end portions having the same pore density as the partition wall 54 are bonded to each other.

According to the present embodiment also, it is of course permissible to increase the bonding strength of the tips of the partition walls 54 by loading the end portions of the partition walls 54 bonded together with a substance capable of oxidizing the particulates.

According to the present embodiment, a step of reducing the average pore diameter of the end portions of the partition walls 54 to be bonded together may be executed between a step of closing the exhaust gas flow path in the honeycomb structure 80 with the end portions and a step of baking the honeycomb structure 80. A step of loading the honeycomb structure 80 with a substance capable of oxidizing the particulates may be carried out after a step of baking the honeycomb structure 80.

Next, a particulate filter of the fourth embodiment will be described. According to the present embodiment, the bonding strength of the tips of the end portions of the partition walls to be bondeded together is incresed in order to prevent the tips of the end portions of the partition walls, which compose the tapered wall, from being separated and producing a hole when the honeycomb structure is baked. That is, an object of the above-described embodiment is to prevent a hole from being made in the tip of the tapered wall.

The object of the fourth embodiment is to prevent exhaust gas from flowing out of a hole in the tip of the tapered wall by closing the hole made in the tip of the tapered wall in a simple way. More specifically, according to the fourth embodiment, a hole made in the tip of each of the tapered walls 52, 53 is closed by loading the tips of the tapered walls 52, 53 with a substance capable of oxidizing the particulates after the honeycomb structure 80 is baked.

Finally, a substance capable of oxidizing particulates loaded on the particulate filter 22 will be described in detail.

According to the above-described embodiment, a carrier layer made of alumina and the like is formed on the peripheral wall face of each exhaust gas flow-in path 50 and the inside of the peripheral walls and each exhaust gas flow-out path 51 i.e., both side surfaces and inside of each partition wall 54, both side surface and inside of the tapered walls 52, 53, and both side surfaces and inside of a reinforcement member if it is provided. Then, this carrier is loaded with noble metal catalyst and active oxygen discharging agent which if excessive oxygen exists, takes in and retains oxygen and if the concentration of oxygen decreases, releases the retained oxygen in the form of active oxygen. According to the above-described embodiments, this the substance capable of oxidizing the particulates is the active oxygen discharging agent.

According to the above-described embodiments, platinum Pt is used as noble metal catalyst and as active oxygen discharging agent, at least one selected from alkaline metals such as potassium K, sodium Na, lithium Li, cesium Cs, rubidium Rb, alkaline earth metals such as barium Ba, calcium Ca, strontium Sr, rare earth elements such as lanthanum La, yttrium Y, cerium Ce, transition metal such as iron Fe, and carbon group element such as tin Sn is employed.

It is preferable to use alkaline metal or alkaline earth metal ensuring a higher ionization tendency than calcium Ca, such as potassium K, lithium Li, cesium Cs, rubidium Rb, barium Ba, and strontium Sr.

Next, an action for removing particulates from exhaust gas by means of the particulate filter 22 will be described about a case where platinum Pt and potassium K are loaded on a carrier. The same particulate removal action is carried out if other noble metals, alkaline metals, alkaline earth metals, rare earth elements, or transition metals are employed.

For example, if exhaust gas flowing into the particulate filter 22 is gas emitted from a compression ignition type internal combustion engine which burns with excessive air, exhaust gas flowing into the particulate filter 22 contains a great amount of excessive air. That is, if the ratio between air and fuel supplied into an intake air path and a fuel combustion chamber is referred to as air-fuel ratio of exhaust gas, the air-fuel ratio of exhaust gas in the compression ignition type internal combustion engine is lean. Further, since NO is generated in the fuel combustion chamber of the compression ignition type internal combustion engine, NO is contained in exhaust gas. Added to that, sulfur component S is contained in fuel and this sulfur component S reacts with oxygen in the fuel combustion chamber so as to produce $SO_2$. Therefore, $SO_2$ is contained in exhaust gas. Thus, exhaust gas containing excessive oxygen, NO, and $SO_2$ flows into the exhaust gas flow-in path 50 of the particulate filter 22.

Figure 8A:
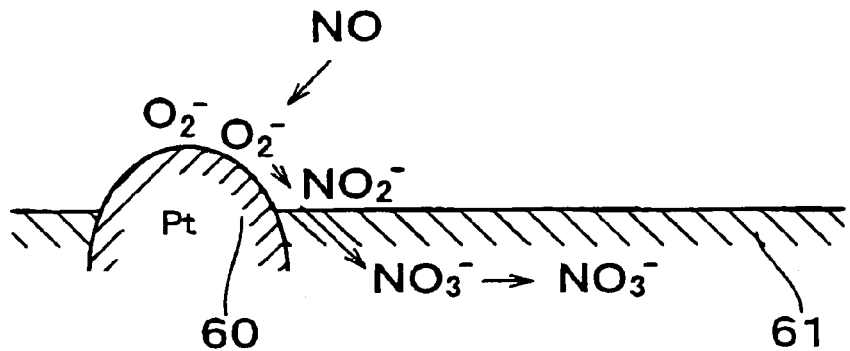
FIGS. 8A, 8B are diagrams for explaining oxidation process of particulates.
Figure 8B:
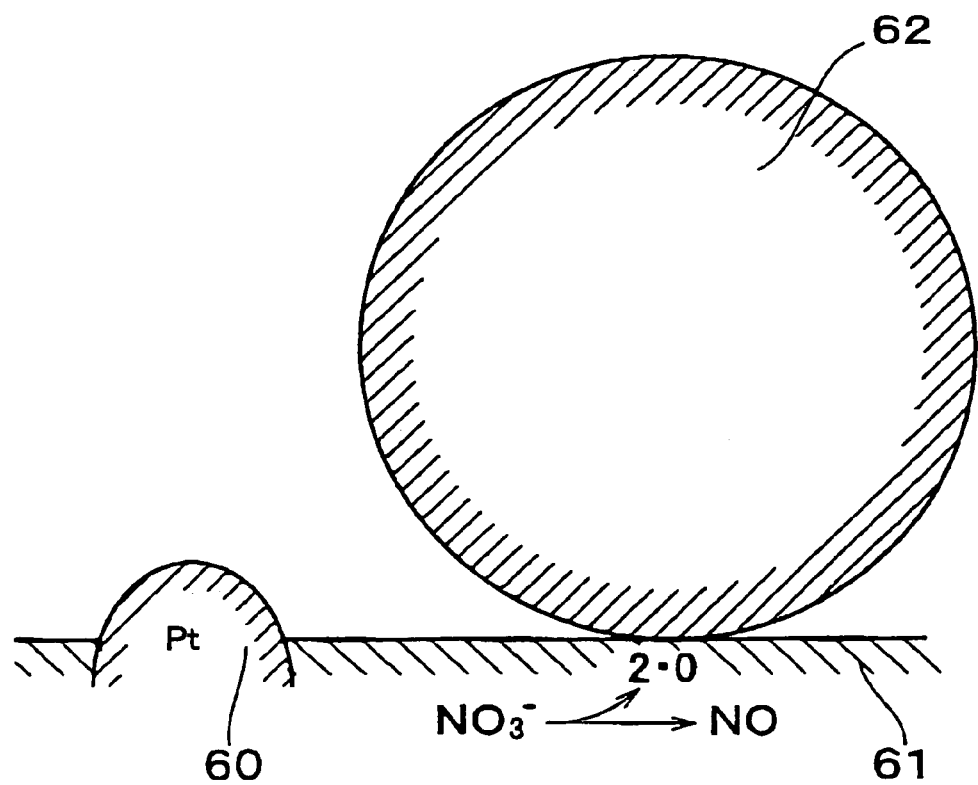

FIGS. 8A, 8B show schematically an enlarged diagram of the surface of a carrier formed on an inner peripheral face of the exhaust gas flow-in path 50. In FIGS. 8A, 8B, the particulate 60 is a particulate of platinum Pt and the active oxygen discharging agent 61 contains potassium K.

As described above, since exhaust gas contains a large amount of excessive oxygen, if exhaust gas flows into the exhaust gas flow-in path 50 in the particulate filter 22, oxygen $O_2$ adheres to the surface of platinum Pt 60 in the form of $O_2^-$ or $O^{2-}$. On the other hand, NO in exhaust gas reacts with $O_2^-$ or $O^{2-}$ on the surface of platinum Pt 60 so as to produce $NO_2$ ($2NO+O_2 \rightarrow 2NO_2$) Part of $NO_2$ generated next is oxidized on platinum Pt 60 and absorbed into the active oxygen discharging agent 61 and then combined with potassium K so that it is diffused into the active oxygen discharging agent 61 in the form of nitrate ion $NO_3^-$ and produces potassium nitrate $KNO_3$.

On the other hand, $SO_2$ is contained in exhaust gas as described above and this $SO_2$ is absorbed in the active oxygen discharging agent 61 in the same mechanism as NO. That is, as described above, oxygen $O_2$ adheres to the surface of platinum Pt 60 in the form of $O_2^-$ or $O^{2-}$ and $SO_2$ in exhaust gas reacts with $O_2^-$ or $O^{2-}$ on the surface of platinum Pt 60 and turns to $SO_3$. Part of $SO_3$ generated next is oxidized on platinum Pt 60 and absorbed into the active oxygen discharging agent 61, so that it is combined with potassium K and diffused into the active oxygen discharging agent 61 in the form of sulfuric ion $SO_4^{2-}$ so as to produce potassium sulfate $K_2SO_4$. As a result, potassium nitrate $KNO_3$ and potassium sulfate $K_2SO_4$ are generated.

On the other hand, particulates composed of mainly carbon C are generated in a combustion chamber and therefore, these particulates are contained in exhaust gas. When exhaust gas flows in the exhaust gas flow-in path 50 in the particulate filter 22 or flows from the exhaust gas flow-in path 50 to the exhaust gas flow-out path 51, these particulates 62 contained in exhaust gas come into contact with and adhere to the surface of a carrier, for example, the active oxygen discharging agent 61.

If particulates 62 adhere to the surface of the active oxygen discharging agent 61, the concentration of oxygen on the contact face between the particulates 62 and the active oxygen discharging agent 61 decreases. If the concentration of oxygen decreases, a difference in the concentration of oxygen occurs between the contact face of the active oxygen discharging agent 61 and the active oxygen discharging agent 61 whose concentration of oxygen is higher, so that oxygen in the active oxygen discharging agent 61 tries to move toward the contact face between the particulates 62 and the active oxygen discharging agent 61. As a result, potassium nitrate $KNO_3$ formed in the active oxygen discharging agent 61 is decomposed to potassium K, oxygen O and NO. Oxygen 0 moves toward the contact face between the particulates 62 and the active oxygen discharging agent 61, while NO is discharged out of the active oxygen discharging agent 61. NO discharged out is oxidized on platinum Pt 60 downstream and absorbed into the active oxygen discharging agent 61 again.

In addition, potassium sulfate $K_2SO_4$ formed in the active oxygen discharging agent 61 is decomposed to potassium K, oxygen O, and $SO_2$. Oxygen 0 moves toward the contact face between the particulates 62 and the active oxygen discharging agent 61, while $SO_2$ is discharged out of the active oxygen discharging agent 61. $SO_2$ discharged out is oxidized on platinum Pt 60 downstream and absorbed into the active oxygen discharging agent 61 again. However, since potassium sulfate $K_2SO_4$ is stable and difficult to decompose, potassium sulfate $K_2SO_4$ does not easily emit active oxygen than potassium nitrate $KNO_3$.

The active oxygen discharging agent 61 generates and discharges active oxygen also in a reaction process with oxygen when $NO_x$ is absorbed in the form of nitrate ion $NO_3^-$ as described above. Likewise, the active oxygen discharging agent 61 generates and discharges active oxygen in a reaction process with oxygen when $SO_2$ is absorbed in the form of sulfate ion $SO_4^{2-}$.

Oxygen O that moves toward the contact face between the particulates 62 and the active oxygen discharging agent 61 is oxygen which is generated by decomposing such compound as potassium nitrate $KNO_3$; potassium sulfate $K_2SO_4$. Oxygen O generated by decomposing the compound has a high energy and an extremely high activity. Thus, oxygen which moves toward the contact face between the particulates 62 and the active oxygen discharging agent 61 acts as active oxygen O. Likewise, oxygen generated in a reaction process between $NO_x$ and oxygen in the active oxygen discharging agent 61 or in a reaction process between $SO_2$ and oxygen acts as active oxygen. If the active oxygen O are in contact with the particulates 62, the particulates 62 are oxidized without any luminous flame in a short time (several seconds to several tens minutes), so that the particulates 62 are vanished completely. Therefore, the particulates 62 are hardly deposited on the particulate filter 22.

Some type of the particulate filter is heated in red and burns the particulates with flame when particulates deposited in layers on the particulate filter are burned. The combustion with a flame does not continue unless a high temperature is kept. Therefore, the temperature of the particulate filter has to be kept high in order to continue combustion with the flame.

According to the embodiment of the invention, the particulates 62 are oxidized without any luminous flame as described above, and the surface of the particulate filter 22 is not heated in red. In other words, according to the embodiment of the invention, the particulates 62 are oxidized and removed under a relatively lower temperatures as compared to combustion with flame. Therefore, the particulate removal action by oxidation of particulates 62 without any luminous flame according to the embodiment of the invention is completely different from the particulate removal action by combustion with flame.

Since platinum Pt 60 and active oxygen discharging agent 61 are activated more as the temperature of the particulate filter 22 is increased, the amount of oxidation removable particulates without luminous flame per unit time on the particulate filter 22 is increased as the temperature of the particulate filter 22 is increased.

Figure 10:
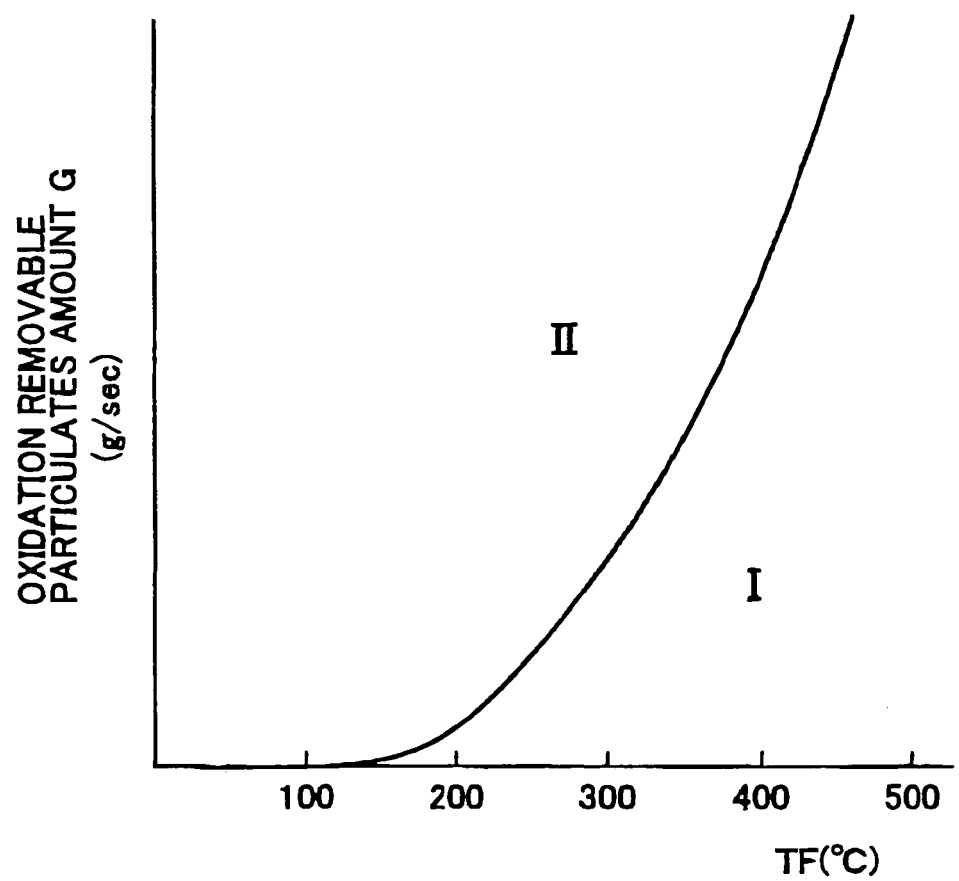
FIG. 10 is a diagram showing the relation between the amount of oxidation removable particulates and the temperature of the particulate filter.

A solid line in FIG. 10 indicates the amount G of oxidation removable particulates without luminous flame per unit time. The horizontal axis in FIG. 10 indicates the temperature TF of the particulate filter 22. Hereafter, the amount of particulates flowing into the particulate filter 22 per unit time is referred to as flow-in particulate amount M. If this flow-in particulate amount M is smaller than the oxidation removable particulates G i.e., within a region I in FIG. 10, all particulates flowing into the particulate filter 22 being contact with the particulate filter 22 are oxidized without any luminous flame on the particulate filter 22 in a short time (several seconds to several ten minutes) and removed.

Figure 9A:
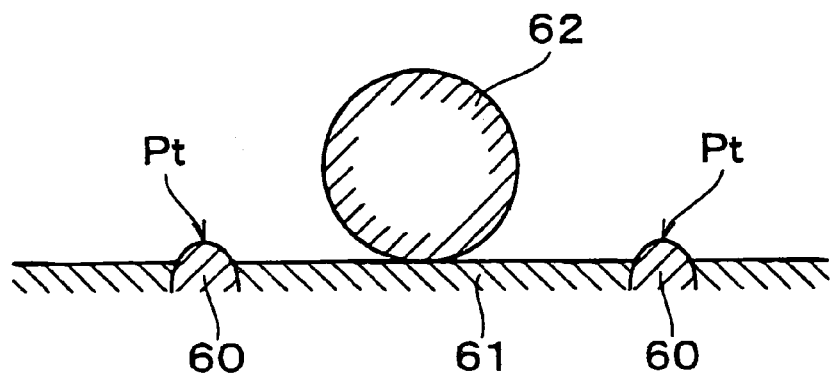
FIGS. 9A, 9C are diagrams for explaining deposition process of particulates.
Figure 9B:
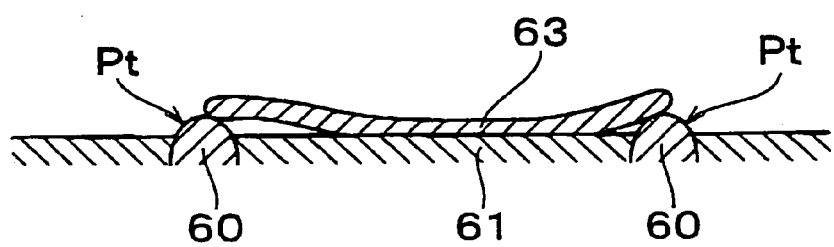
Figure 9C:
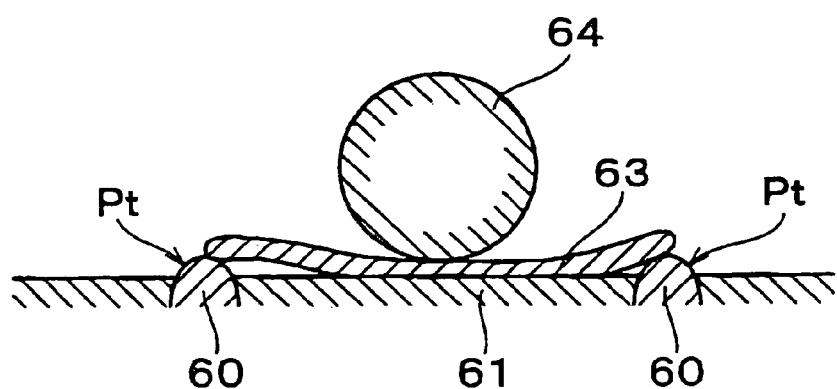

Contrary to this, if the flow-in particulate amount M is larger than the oxidation removable particulate amount G i.e., within a region H in FIG. 10, the amount of active oxygen is not enough for oxidizing all particulates. FIGS. 9A to 9C show the state of oxidation of particulates in such a case. That is, if the amount of active oxygen is short for oxidizing all particulates and the particulates 62 adhere to the active oxygen discharging agent 61 as shown in FIG. 9A, only part of the particulates 62 is oxidized, while part of the particulates which is not oxidized sufficiently remains on the carrier. If the state in which the active oxygen amount is not enough continues, particulates which are not sufficiently oxidized remain on the carrier successively, so that as shown in FIG. 9B, the surface of the carrier is covered with remaining particulate portion 63.

If the surface of the carrier is covered with the remaining particulate portion 63, oxidation of NO and $SO_2$ by platinum Pt 60 and discharge of active oxygen by the active oxygen discharging agent 61 are eliminated, so that the remaining particulate portion 63 is left without being oxidized and slightly after, other particulates are deposited successively on the remaining particulate portion 63 as shown in FIG. 9C. That is, the particulates are deposited in layers.

If the particulates are deposited in layers, the particulates 64 are never oxidized by active oxygen 0 and therefore, other particulates are deposited successively on the particulates 64. That is, if the state in which the flow-in particulate amount M is larger than the oxidation removable particulate amount G is continued, particulates are deposited in layers on the particulate filter 22 and the deposited particulates cannot be ignited and burnt until the temperature of exhaust gas is raised high or the temperature of the particulate filter 22 is raised high.

In the region I of FIG. 10, particulates are oxidized on the particulate filter 22 without any luminous flame in a short time and in the region II of FIG. 10, particulates are deposited in layers on the particulate filter 22. Thus, the flow-in particulate amount M always needs to be smaller than the oxidation removeable particulate amount G for the particulates not to be deposited in layers on the particulate filter 22.

As evident from FIG. 10, the particulate filter 22 used in the embodiments of the invention is capable of oxidizing particulates even if the temperature TF of the particulate filter 22 is quite low. Thus, the flow-in particulate amount M and the temperature TF of the particulate filter 22 are kept so that the flow-in particulate amount M is always smaller than the oxidation removable particulate amount G.

If the flow-in particulate amount M is always smaller than the oxidation removable particulate amount G, few particulates are deposited on the particulate filter 22, so that the back pressure is increased little.

On the other hand, if particulates are deposited in layers on the particulate filter 22 as described above, even if the flow-in particulate amount M becomes smaller than the oxidation removable particulate amount G, it is difficult to oxidize the particulates with active oxygen 0. That is, if the flow-in particulate amount M becomes smaller than the oxidation removable particulate amount G when the particulates are deposited only below a predetermined level, this remaining particulate portion is oxidized without any luminous flame by the active oxygen O and removed.

If a case in which the particulate filter 22 is disposed in the exhaust gas path of an internal combustion engine and actually employed is considered, fuel and lubricant contain calcium Ca and therefore, calcium Ca is contained in exhaust gas. If $SO_3$ exists, this calcium Ca generates calcium sulfate $CaSO_4$. This calcium sulfate $CaSO_4$ is solid, which is not thermally decomposed even at a high temperature. Thus, if calcium sulfate $CaSO_4$ is generated and the pore in the particulate filter 22 is closed by this calcium sulfate $CaSO_4$, exhaust gas does not easily flow in the particulate filter 22.

In this case, if alkaline metal or alkaline earth metal having a higher ionization tendency than calcium Ca, for example, potassium K is employed as the active oxygen discharging agent 61, $SO_3$ diffused in the active oxygen discharging agent 61 is combined with potassium K so as to form potassium sulfate $K_2SO_4$. Calcium Ca passes through the partition wall 54 of the particulate filter 22 without being combined with $SO_3$ and flows out into the exhaust gas flow-out path 51. Thus, the pores in the particulate filter 22 are never clogged. Therefore, preferably, as the active oxygen discharging agent 61, alkaline metal or alkaline earth metal having a higher ionization tendency than calcium Ca i.e., potassium K, lithium Li, cesium Cs, rubidium Rb, barium Ba, or strontium Sr is employed.

The embodiments of the invention can be applied to a case where only noble metal such as platinum Pt 60 is loaded on the layer of a carrier formed on both side faces of the particulate filter 22. However, in this case, the solid line indicating the oxidation removable particulate amount G is moved slightly to the right as compared to the solid line shown in FIG. 10. In this case, active oxygen is discharged from $NO_2$ or $SO_3$ retained on the surface of the platinum Pt 60.

Further, it is permissible to employ a catalyst, which absorbs $NO_2$ or $SO_3$ as the active oxygen discharging agent and can discharge active oxygen from these absorbed $NO_2$ or $SO_3$.

The invention claimed is:

1. A manufacturing method of a particulate filter for collecting particulates in exhaust gas, comprising:
    forming a preliminary formed body having substantially parallel partition walls defining a path by extruding porous material;
    closing the path of the preliminary formed body by gathering an end portion of the partition wall of the preliminary formed body so that tips of adjacent end portions are in contact with each other forming tapered end portions;
    baking the preliminary formed body; and
    reinforcing the closed portion in the path by covering the tapered end portions.

2. The manufacturing method according to claim 1, wherein
    the closed portion is reinforced by disposing a reinforcement member at the end portion of the partition walls of the preliminary formed body, gathering the tips of the partition walls of the preliminary formed body together with the reinforcement member, closing the path of the preliminary formed body by bringing the tips of the end portions into contact with each other to form tapered end portions and baking the preliminary formed body and the reinforcement member.

3. The manufacturing method according to claim 1, wherein after the path of the preliminary formed body is closed, the closed portion is reinforced by providing the tapered end portion with the reinforcement member.

4. The manufacturing method according to claim 1, wherein the closed portion is reinforced by loading the tip of the tapered end portion with a substance capable of oxidizing particulates.

5. The manufacturing method according to claim 1, further comprising a step of:
    reducing an average pore diameter of the tapered end portion between closing the path and baking the preliminary formed body.

6. A manufacturing method of the particulate filter for collecting particulates in exhaust gas, comprising:
    forming a preliminary formed body having substantially parallel partition walls defining a path by extruding porous material;
    closing the path of the preliminary formed body by gathering an end portion of the partition wall of the preliminary formed body so that tips of adjacent end portions are in contact with each other forming tapered end portions;
    baking the preliminary formed body; and
    loading the tapered end portion with a substance capable of oxidizing particulates.

7. The manufacturing method according to claim 6, further comprising a step of:
    reducing an average pore diameter of the tapered end portion between closing the path and baking the preliminary formed body.

8. An exhaust gas purifying apparatus comprising:
    a particulate filter for collecting particulates in exhaust gas; and
    a reinforcement member provided at an end portion of a path of the particulate filter,
    wherein the end portion of the path of the particulate filter includes a bonding portion bonded together at a predetermined bonding strength when tips of adjacent partition walls formed of porous material defining the path are brought into contact, forming tapered end portions, and baked, and
    wherein said reinforcement member covers the tapered end portions.

9. The exhaust gas purifying apparatus according to claim 8, wherein the reinforcement member is a member made of porous material, loaded with a substance capable of oxidizing the particulates.

10. The exhaust gas purifying apparatus according to claim 8, wherein an average pore diameter of the reinforcement member is smaller than an average pore diameter of the partition wall.

11. The exhaust gas purifying apparatus according to claim 8, wherein the adjacent partition walls at the end portion are bonded together over a predetermined length from the tip of the partition wall.

12. The exhaust gas purifying apparatus according to claim 11, wherein the adjacent partition walls to be bonded together are parallel beyond the predetermined length from the tip of the partition wall.

13. The exhaust gas purifying apparatus according to claim 11, wherein the tips of the adjacent partition walls are bonded together through a predetermined contact area wherein a contact area of the tips of the adjacent partition walls is increased by increasing the contact area per unit area of the tips at the bonding portion.

14. The exhaust gas purifying apparatus according to claim 13, wherein by decreasing an average pore diameter of the bonding portion, the contact area is increased.

15. The exhaust gas purifying apparatus according to claim 14, wherein by loading the bonding portion with a substance capable of oxidizing the particulates, the average pore diameter of the bonding portion is decreased.

16. The exhaust gas purifying apparatus according to claim 15, wherein the partition wall is loaded with a substance capable of oxidizing the particulates and the amount of substance loaded on the bonding portion is larger than the amount of the substance loaded on a portion of the partition wall other than the bonding portion.

17. The exhaust gas purifying apparatus according to claim 8, wherein the bonding portion is loaded with a substance capable of oxidizing the particulates.

18. The exhaust gas purifying apparatus according to claim 8, wherein the particulate filter contains a plurality of paths and in part of the paths, downstream end portions of the partition walls defining the paths are gathered forming the tapered end portions, while in the remaining paths, upstream end portions defining the paths are forming the tapered end portions.

19. An exhaust gas purifying apparatus comprising:
    a particulate filter for collecting particulates in exhaust gas,
    wherein an end portion of a path of the particulate filter including a bonding portion is bonded at a predetermined bonding strength when tips of the adjacent partition walls are in contact with each other, forming tapered end portions, and baked, and an amount of substance capable of oxidizing the particulates loaded on the bonding portion is larger than the amount of the substance loaded on a portion of the partition wall other than the end portion.

20. The exhaust gas purifying apparatus according to claim 19, wherein the substance capable of oxidizing the particulates is loaded on the bonding portion only.

21. A particulate filter for collecting particulates in exhaust gas comprising:

a body portion formed with partition walls made of porous material defining a path in which the exhaust gas flows;

an end portion including a bonding portion bonded at a predetermined bonding strength when tips of the adjacent partition walls are in contact with each other, forming tapered end portions, and baked; and a reinforcement member that reinforces the bonding portion provided at the tapered end portion by covering the tapered end portions.

22. A particulate filter for collecting particulates in exhaust gas comprising:

a body portion formed with partition walls made of porous material defining a path in which the exhaust gas flows; and a bonding portion baked with tips of the adjacent partition walls being in contact with each other, wherein an amount of substance capable of oxidizing the particulates loaded on the bonding portion is larger than the amount of the substance loaded on a portion of the partition wall other than the end portion.

23. The particulate filter according to claim 22, wherein the substance capable of oxidizing the particulates is loaded on the bonding portion only.

* * * * *